United States Patent
Dietz et al.

(10) Patent No.: US 12,235,394 B2
(45) Date of Patent: Feb. 25, 2025

(54) METHOD AND SYSTEM FOR PROCESSING LASER SIGNAL TAKEN BY LASER DEVICE

(71) Applicant: Aptiv Technologies AG, Schaffhausen (CH)

(72) Inventors: Roman Dietz, Berlin (DE); Denis Rainko, Essen (DE); Geng Fu, Belmont, MA (US); Ali Haddadpour, Boston, MA (US)

(73) Assignee: Aptiv Technologies AG, Schaffhausen (CH)

( * ) Notice: Subject to any disclaimer, the term of this patent is extended or adjusted under 35 U.S.C. 154(b) by 1125 days.

(21) Appl. No.: 17/096,776

(22) Filed: Nov. 12, 2020

(65) Prior Publication Data

US 2021/0149031 A1 May 20, 2021

(30) Foreign Application Priority Data

Nov. 15, 2019 (EP) .................................. 19209595

(51) Int. Cl.
*G01S 7/4911* (2020.01)
*G01S 7/4912* (2020.01)
(Continued)

(52) U.S. Cl.
CPC ........... *G01S 7/4911* (2013.01); *G01S 7/4917* (2013.01); *G01S 17/42* (2013.01); *G01S 17/931* (2020.01)

(58) Field of Classification Search
None
See application file for complete search history.

(56) References Cited

U.S. PATENT DOCUMENTS 4,594,000 A 6/1986 Falk et al.
4,846,571 A * 7/1989 Jelalian ................. G01S 7/4917
356/28.5
(Continued)

FOREIGN PATENT DOCUMENTS

EP 2618179 7/2013
EP 3822658 5/2021
(Continued)

OTHER PUBLICATIONS

JP-2012167948-A English (Year: 2021).*
(Continued)

*Primary Examiner* — Luke D Ratcliffe
*Assistant Examiner* — Jempson Noel
(74) *Attorney, Agent, or Firm* — Harness, Dickey & Pierce, P.L.C.

(57) ABSTRACT

Described are techniques for processing a laser signal to illuminate an external scene that is sectored in pixels by a laser device. This includes frequency modulating a laser signal in up and down-chirps, illuminating the external scene, receiving a reflected laser signal, measuring an up-beat signal, measuring a down-beat signal, simultaneously illuminating the external scene with the up-chirp and with the down-chirp for at least one pixel, and amplitude modulating the modulated laser signal of at least two adjacent pixels, so that the calculating unit can distinguish the reflected laser signals of two adjacent pixels. This way, in order to allow for fast scanning of a single frame, up- and down-chirps are sent out simultaneously to scan a complete pixel row or line within one ramp without any waiting time and without any chirp reset on each pixel.

20 Claims, 2 Drawing Sheets

(51) Int. Cl.
*G01S 17/42* (2006.01)
*G01S 17/931* (2020.01)

(56) References Cited

U.S. PATENT DOCUMENTS

| | | | | |
|---|---|---|---|---|
| 4,849,762 | A * | 7/1989 | Barnes | G01S 7/024 |
| | | | | 342/188 |
| 5,283,795 | A * | 2/1994 | Fink | H01S 3/08009 |
| | | | | 372/28 |
| 7,339,518 | B2 | 3/2008 | Kazuma et al. | |
| 8,597,577 | B2 * | 12/2013 | Flagan | H01S 5/0687 |
| | | | | 436/63 |
| 2015/0177379 | A1 * | 6/2015 | Smith | G01S 7/4817 |
| | | | | 356/5.09 |
| 2016/0123715 | A1 * | 5/2016 | Froggatt | G01B 9/02044 |
| | | | | 65/102 |
| 2016/0123718 | A1 | 5/2016 | Roos et al. | |
| 2016/0377721 | A1 | 12/2016 | Lardin et al. | |
| 2017/0146648 | A1 | 5/2017 | Lim et al. | |
| 2018/0284247 | A1 * | 10/2018 | Campbell | G01S 17/10 |
| 2019/0018110 | A1 | 1/2019 | Kremer et al. | |
| 2019/0025431 | A1 * | 1/2019 | Satyan | G01S 7/4914 |
| 2019/0086518 | A1 | 3/2019 | Hallstig et al. | |
| 2019/0310372 | A1 * | 10/2019 | Crouch | G01S 17/26 |
| 2020/0182978 | A1 * | 6/2020 | Maleki | G01S 17/42 |
| 2021/0247490 | A1 | 8/2021 | Fu | |
| 2022/0003854 | A1 | 1/2022 | Delaus et al. | |
| 2022/0011417 | A1 | 1/2022 | Hao et al. | |

FOREIGN PATENT DOCUMENTS

| | | | |
|---|---|---|---|
| EP | 3822659 | | 5/2021 |
| JP | 2012167948 | A * | 9/2012 |
| WO | 2018067158 | | 4/2018 |
| WO | 2018160240 | | 9/2018 |

OTHER PUBLICATIONS

"Extended European Search Report", EP Application No. 21182491.7, Nov. 30, 2021, 9 pages.

"Extended European Search Report", EP Application No. 21183613.5, Dec. 2, 2021, 9 pages.

"Extended European Search Report", European Application No. 19209595.8, Sep. 28, 2020, 13 pages.

Baghmisheh, "Chip-scale Lidar", Jan. 19, 2017, 46 pages.

Gao, et al., "Complex-Optical-Field Lidar System for Range and Vector Velocity Measurement", Optics Express, vol. 20, Issue 23, pp. 25867-25875; Retrieved from https://doi.org/10.1364/OE.20.025867, Nov. 1, 2012, 9 pages.

Gao, "Frequency-modulated Continuous-wave Lidar using I/Q Modulator for Simplified Heterodyne Detection", Optic Letters / vol. 37, No. 11, Jun. 1, 2012, pp. 2022-2024, 3 pages.

Kakuma, "Frequency-Modulated Continuous-Wave Laser Radar Using Dual Vertical-Cavity Surface-Emitting Laser Diodes for Real-Time Measurements of Distance and Radial Velocity", Optical Review, 24, 39-46, Dec. 3, 2016, 8 pages.

Khader, et al., "An Introduction to Automotive LIDAR", Texas Instruments Incorporated, 2018, Oct. 2018, 7 pages.

Mateo, "Applications of High Resolution and Accuracy Frequency Modulated Continuous Wave Ladar", Thesis—Montana State University, Nov. 2014, 130 pages.

Onori, et al., "Coherent Interferometric Dual-Frequency Laser Radar for Precise Range/Doppler Measurement", Journal of Lightwave Technology, vol. 34, Issue: 20, Retrieved from https://doi.org/10.1109/JLT.2016.2589538, Oct. 2016, 6 pages.

Xu, et al., "Simultaneous Real-Time Ranging and Velocimetry via a Dual-Sideband Chirped Lidar", IEEE Photonics Technology Letters, vol. 29, Issue: 24, Dec. 2017, 4 pages.

Zhang, et al., "Laser frequency sweep linearization by iterative learning pre-distortion for FMCW LiDAR", Mar. 2019, 10 pages.

"Extended European Search Report", EP Application No. 21152779.1, Jul. 15, 2021, 8 pages.

"Extended European Search Report", EP Application No. 20206998.5, Jul. 28, 2021, 13 pages.

* cited by examiner

METHOD AND SYSTEM FOR PROCESSING LASER SIGNAL TAKEN BY LASER DEVICE

CROSS-REFERENCE TO RELATED APPLICATION

This application claims priority to European Patent Application Number 19209595.8, filed Nov. 15, 2019, the disclosure of which is hereby incorporated by reference in its entirety herein.

TECHNICAL FIELD

The present disclosure relates to a method for processing a laser signal to illuminate and capture an external scene with a laser device. In particular, the disclosure relates to the analysis of an external scene with a Lidar (light detection and ranging) implementing a laser source.

BACKGROUND

Frequency-modulated continuous-wave (FMCW) Lidar is considered as a promising technology for next generation autonomous driving sensors, since it allows for high angular resolution, strong signal to noise ratio (SNR), immunity to ambient light and measuring range and velocity at the same time. Typically, the emitted and reflected laser signals are modulated in consecutive up-chirps and down-chirps having a constant slope, and up and down beat signals can be determined due to a Doppler shift, if the relative velocity is unequal 0 m/s.

However, due to time delays (time to wait for the reflected laser signal to return for a given pixel), and to avoid ambiguity of processing reflected signals of adjacent pixels, this method requires a high pixel throughput for a vast field of view with a large quantity of pixels.

SUMMARY OF DISCLOSURE

The present disclosure aims to address the above mentioned drawbacks of the background, and to propose first a method for processing laser signal for illuminating and capturing an external scene by a laser device, with high angular resolution, strong signal to noise ratio, immunity to ambient light and measuring range and velocity at the same time, even for a high quantity of pixels.

Described are techniques for processing a laser signal to illuminate an external scene that is sectored in pixels by a laser device. This includes frequency modulating a laser signal in up and down-chirps, illuminating the external scene, receiving a reflected laser signal, measuring an up-beat signal, measuring a down-beat signal, simultaneously illuminating the external scene with the up-chirp and with the down-chirp for at least one pixel, and amplitude modulating the modulated laser signal of at least two adjacent pixels, so that the calculating unit can distinguish the reflected laser signals of two adjacent pixels. This way, in order to allow for fast scanning of a single frame, up- and down-chirps are sent out simultaneously to scan a complete pixel row or line within one ramp without any waiting time and without any chirp reset on each pixel.

In this aim, a first aspect of the disclosure is a method for processing a laser signal to illuminate and capture an external scene with a laser device, the external scene being sectored in pixels, the method comprising the steps of:
frequency modulating with a first modulating unit a laser signal in up and down-chirps,
illuminating with an illuminating unit the external scene with at least a first part of the modulated laser signal, a second part of the modulated laser signal being used to generate a reference signal,
receiving with a receiving unit a reflected laser signal, having up and down received chirps, for each pixel, characterized in that the method comprises the steps of:
simultaneously illuminating the external scene with the up-chirp of the modulated laser signal and with the down-chirp of the modulated laser signal for at least one pixel, and/or
before illuminating the external scene: amplitude modulating with a second modulating unit the frequency modulated laser signal of at least two adjacent pixels, according to at least two different amplitude modulations, so that a calculating unit can distinguish the reflected laser signals of two adjacent pixels on the basis of the two different amplitude modulations.

The above method comprises the steps of simultaneously illuminating or substantially simultaneously illuminating the external scene with (or sending out) the up and down-chirps, so that there is no waiting time for the half period to send the down-chirp, after the up-chirp. In addition, modulating the laser signal of at least two adjacent pixels, with different amplitude modulations allows to distinguish the signals related to each pixel on the amplitude modulating basis, and not on a time basis. Therefore, the calculations can be executed without time constraints, so that the waiting time can be avoided. In particular, one should note that compared to sequentially illuminating the external scene with the up-chirp, and then with the down-chirp of the modulated laser signal, the disclosure allows to carry out these steps in parallel. Then, at least half time is saved.

In addition, or alternatively, the frequency modulated laser signal (to generate the up and down-chirps which inherently present a varying frequency along time) is in addition modulated with specific amplitude modulation for each pixel. This allows to avoid any waiting time in scanning a row or line of pixels. Indeed, without this second modulation in amplitude, the calculating unit should receive and integrate or process the reflected signal during the illumination time of a given pixel, to avoid any ambiguity. In other words, the pixels are distinguished on a time basis. With the second amplitude modulation, with specific characteristics for each pixel, the calculating unit can distinguish (or assign) the received reflected laser signal to the correct and respective pixel, based on the specific modulation characteristics, even if the signal is received after the illumination period of said pixel. Therefore, the illumination time or period can be easily reduced. In preferred embodiment, the illumination time is limited to the integration time or processing time of the calculating unit.

In other words, the second amplitude modulation is carried out on the laser signal, which is already modulated according to a frequency modulation, and before illumination of the external scene. One can consider that the illuminating unit sends out to the external scene an amplitude modulated—frequency modulated laser signal. Finally, the illuminating unit simultaneously or substantially simultaneously sends out: amplitude modulated up-chirps and amplitude modulated down-chirps. In other words, the Frequency Modulated Continuous Wave (FMCW) Lidar carries out an amplitude modulation onto the continuous signal generated by the first modulating unit, the amplitude modulation being varied or adapted on a pixel to pixel basis.

Advantageously, for at least a plurality of adjacent pixels, the external scene is simultaneously illuminated or almost simultaneously illuminated with the up-chirp of the modulated laser signal and with the down-chirp of the modulated laser signal, without any chirp reset between adjacent pixels. To avoid any abrupt step in the sent out signals, the up and down-chirps are not reset when passing to one pixel to the adjacent one. This avoids processing operations such as smoothing or cutting, or sampling signals. This also allows to illuminate adjacent pixels without any waiting time.

Consequently, the up and down-chirps of the frequency modulated laser signal can overlap or cross each over at a given point of time, hereafter called overlapping time To.

Advantageously, the up and down-chirps of the modulated laser signal are each polarized with a specific polarization. Accordingly, even at the overlapping time To, it is possible to distinguish the up-chirp from the down-chirp. In other words, the method comprises a step of setting a specific polarization for the up-chirp (for example a vertical polarization) and for the down-chirp (for example a horizontal polarization). In addition to the step of distinguishing the up-chirp from the down-chirp, the specific polarization of the up-chirp and of the down-chirp can allow a step of recognition different road or target conditions.

Advantageously, a matched filter is used, at least during the overlapping of the up and down-chirps. In detail, the method can comprise a step of correlating the known delayed emitted signal (emitted up and down-chirps) with the received signal to identify and select the presence of the emitted signal in the received reflected signal, so as to identify, and/or assign and/or split the relevant part of the reflected signal originating from, or to be assigned to, the emitted up-chirp or to the down-chirp.

One should note that when specific polarizations are applied to the up and down-chirps, the polarization of the illuminating signal might change during the reflection on a target and that by using a beam splitter on the receiving unit side, a portion of the up- and down-chirps will be mixed, which can be taken into account using matched filtering.

Advantageously, the method can also take into account the part of the reflected up and down-chirps signal received before or slightly before the overlapping time To (typically within a time frame of a few micro-seconds for example) to predict, and/or compare with, the reflected signal at the overlapping time To, so as to identify, and/or assign and/or split the relevant part of the reflected signal originating from, or to be assigned to, the emitted up-chirp or to the down-chirp.

Advantageously, the external scene is simultaneously illuminated with the up-chirp of the modulated laser signal and with the down-chirp of the modulated laser signal so as to simultaneously receive from the external scene the up and down received chirps for each pixel.

Advantageously, for at least one pixel:
the up-chirp of the modulated laser signal is amplitude modulated according to an up-amplitude modulation,
the down-chirp of the modulated laser signal is amplitude modulated according to a down-amplitude modulation, different from the up-amplitude modulation.

According to the above embodiment, to help differentiation of signals by the calculating unit, for a same pixel, the up-chirp is modulated according to a specific modulation, and the down-chirp is modulated according to another specific modulation. This embodiment might be carried out by the first modulating unit, while or after carrying out the frequency modulation of the laser signal. This is in addition to the amplitude modulation carried out by the second modulating unit.

Advantageously, the method comprises the steps of:
before illuminating the external scene and/or before amplitude modulating the modulated laser signal: splitting the modulated laser signal with a laser splitter unit, so as to send a first part of the modulated laser signal to the illuminating unit, and to generate a reference signal with a second part of the modulated laser signal serving as a reference local oscillator signal,
before measuring the up and down beat signals for each pixel: mixing the received reflected laser signal with the second part of the reference local oscillator signal.

The second part of the modulated laser signal is used as a reference signal, to compare with the received reflected signal. Typically, the calculating unit comprises a coherent sensor, to measure the up and down-beat signals.

Advantageously, the method comprises:
measuring with a calculating unit an up-beat signal from a difference between the reference signal and the received up-chirp, for each pixel,
measuring with the calculating unit a down-beat signal from a difference between the reference signal and the received down-chirp, for each pixel.

Advantageously, the calculating unit carries out a Fast Fourier Transform (to the mixed modulated reflected laser signal), to distinguish the reflected laser signals of two adjacent pixels. Such Fast Fourier Transform provides a reliable method for distinguishing the reflected signals on the basis of the amplitude modulation, as the side bands will show specific frequencies for each pixel and up and down-chirp.

Advantageously, the step of modulating with the first modulating unit the laser signal in consecutive up and down-chirps having a constant slope, for at least two adjacent pixels, is a step of modulating according to at least two different frequency modulations. This embodiment provides additional reliability to distinguish adjacent pixels, as each pixel is illuminated with a specific modulated laser signal (in frequency). One might consider to specifically adjust the bandwidth for each pixel. For one row or line of pixels, each pixel can be assigned a specific frequency modulation.

According to an embodiment, the up- and/or down-chirps might present a constant or almost constant slope.

A second aspect of the disclosure relates to a method for driving a vehicle, preferably an autonomous vehicle, comprising an external scene processing phase implementing the steps of the method for processing a laser signal according to the first aspect of the disclosure.

A third aspect of the disclosure relates to an external scene analysis module, comprising at least:
a first modulating unit,
an illuminating unit of a laser device,
a receiving unit,
a calculating unit,
a second modulating unit,
and configured to implement the method for processing a laser signal according to the first aspect of the disclosure.

A fourth aspect of the disclosure relates to a vehicle comprising an external scene analysis module according to the third aspect of the disclosure.

A fifth aspect of the disclosure relates to systems comprising means for performing any of the methods described herein.

A sixth aspect of the disclosure relates to a processor or controller of a vehicle, the processor or controller being configured to perform any of the methods described herein.

BRIEF DESCRIPTION OF DRAWINGS

Other features and advantages of the present disclosure will appear more clearly from the following detailed description of particular non-limitative examples of the disclosure, illustrated by the appended drawings where.

DETAILED DESCRIPTION OF EMBODIMENTS

Figure 1:
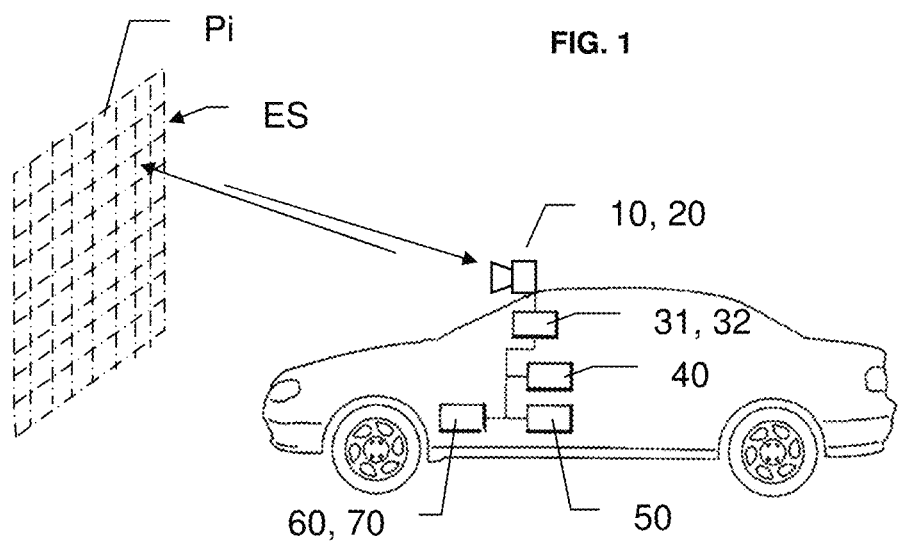
FIG. 1 represents a vehicle equipped with an external scene analysis module comprising a laser device, for implementing the method of processing a laser signal according to the disclosure.

FIG. 1 represents a vehicle equipped with a laser device comprising an illuminating unit 10 and a receiving unit 20. Typically, the laser device is preferably a Lidar. The vehicle also comprises a first modulating unit 31 and a second modulating unit 32, and a calculating unit 40 for processing a laser signal generated by the laser device for illuminating and capturing an external scene ES, represented in front of the vehicle.

However, the external scene ES is not limited to the upfront environment of the vehicle. The external scene ES might include lateral and rear sides of the vehicle.

In addition, the vehicle typically comprises a main controller unit 50, a steering unit 60 for steering the vehicle, and a power unit 70 for controlling speed of the vehicle. In present FIG. 1, all the units are part of the vehicle, but some units (for example the first, second modulating units 31, 32 or the calculating unit 40) might be located out of the vehicle, and linked to the vehicle by radio wave connection.

As sketched FIG. 1, the external scene ES is sectored or divided in pixels Pi, and the method according to the present disclosure is based on the frequency-modulated continuous-wave Lidar.

Figure 2:
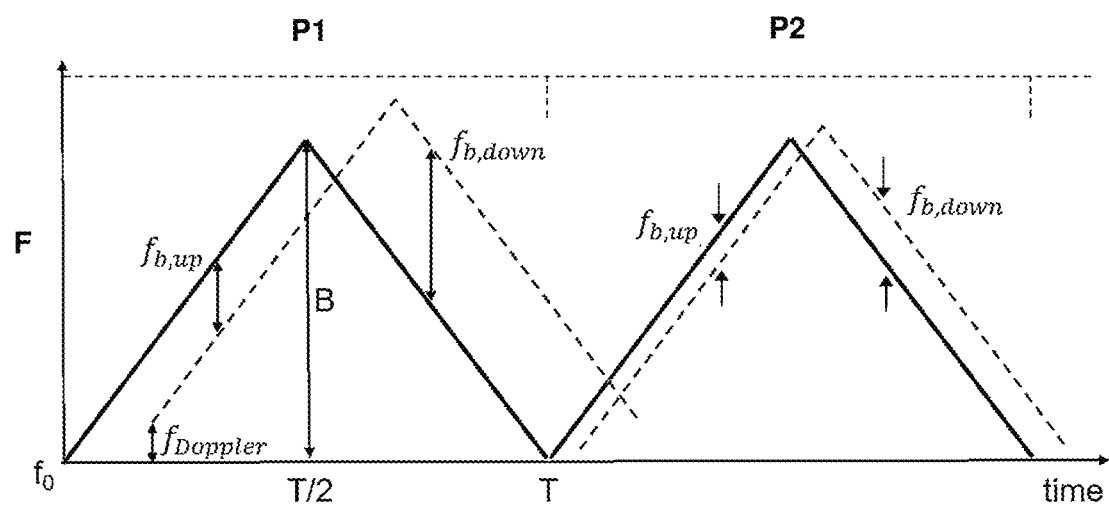
FIG. 2 represents steps of frequency modulation of laser signal into up and down consecutive chirps according to the background.

In particular, and as shown FIG. 2 for background, frequency-modulated continuous-wave Lidar is implementing illuminating the external scene ES with a laser signal by the emitting unit 10 which is previously modulated according to frequency modulation, receiving a reflected laser signal, (reflected by a target present in the external scene ES, not represented) with the receiving unit 20, and measuring the beat signal of reflected laser signal with a split of the modulated laser signal. Typically, the laser signal is generated by laser source, then modulated by first modulating unit 31 (frequency modulation) to generate the up and down-chirps, split by a laser splitter unit, a first part is sent to the illuminating unit 10, a second part serves as a local oscillator, so that a reflected laser signal received by the receiving unit 20 can be mixed with the local oscillator with the first part of the modulated laser signal, so as to measure the beat signal.

The laser frequency $f_0$ is modulated in consecutive up- and down-chirps with a constant slope K=±B/T, (B: bandwidth, T: pixel illumination or scanning time) which gives, for each pixel P1, P2, two beat signals ($f_{b,up}$, $f_{b,down}$) due to a Doppler shift, if the relative velocity v between the vehicle and the target is unequal 0 m/s.

Consequently, a frequency shift is given by:

$$f_R = \frac{2R}{c} K,$$

The Doppler shift is given by:

$$f_{Doppler} = \frac{2v f_0}{c}$$

The up and down beat signal are respectively given by:

$$f_{b,up} = |f_r - f_{Doppler}|, f_{b,down} = |f_r - f_{Doppler}|$$

with R being the target range, c being speed of light, T being the pixel illumination or scanning time and B being the modulation bandwidth.

Hence, each pixel Pi in the field of view is scanned over one chirp period T, respectively, giving range and velocity information per chirp.

Figure 3A:
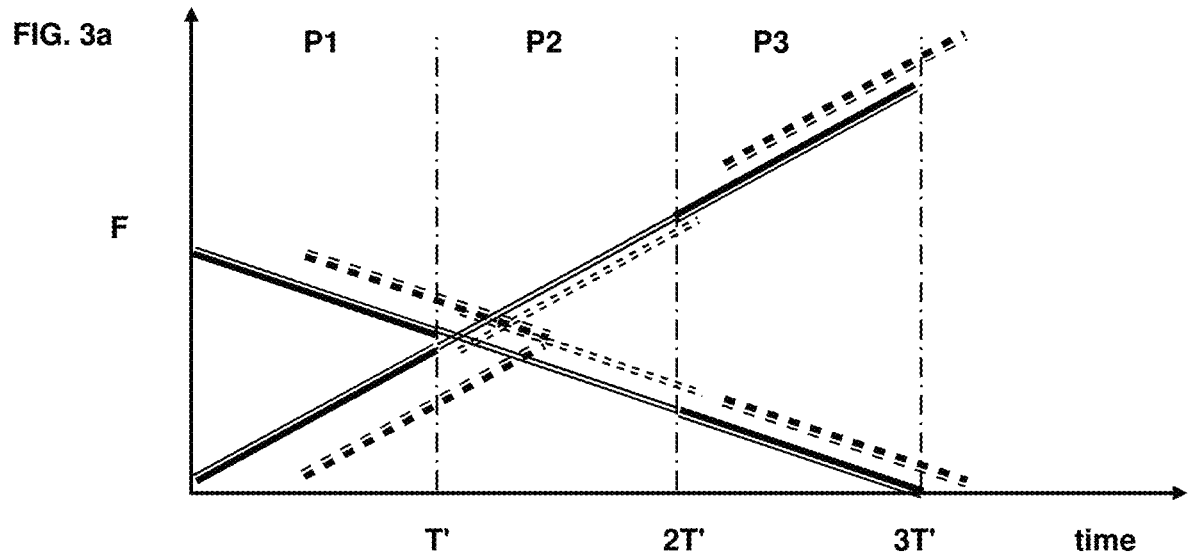
FIG. 3a represents steps of sending up and down-chirps according to the disclosure.

According to the present disclosure, and in order to allow for fast scanning of a single frame, up- and down-chirps are sent out simultaneously to scan a complete pixel row or line within one ramp without any waiting time and without any chirp reset on each pixel, as shown in FIG. 3a.

It is to be noted that the up- and down-chirps are sent out simultaneously or almost simultaneously to illuminate the external scene, meaning that there might be a slight time difference in illuminating the external scene with up- and down-chirps. That is to say, this slight time difference in sending up- and down-chirps is small regarding the pixel illuminating time T' shown FIGS. 3a and 3b. Preferably, the time difference in illuminating the external scene with up- and down-chirps is smaller than 50% of pixel illuminating time T', more preferably the time difference in illuminating the external scene with up- and down-chirps is smaller than 20% of pixel illuminating time T', more preferably the time difference in illuminating the external scene with up- and down-chirps is smaller than 5% of pixel illuminating time T', more preferably the time difference in illuminating the external scene with up- and down-chirps is smaller than 2% of pixel illuminating time T'. Consequently, the reflected up- and down-chirps are received simultaneously or almost simultaneously in the same manner.

As an example for FIG. 3a, if each pixel Pi is illuminated with a laser signal modulated with a bandwidth of 1 GHz, it is possible to have approximately a series of one thousand pixels Pi scanned in one go (a line or column) without any chirp reset, leading to a total bandwidth of approx. 1 THz.

Figure 3B:
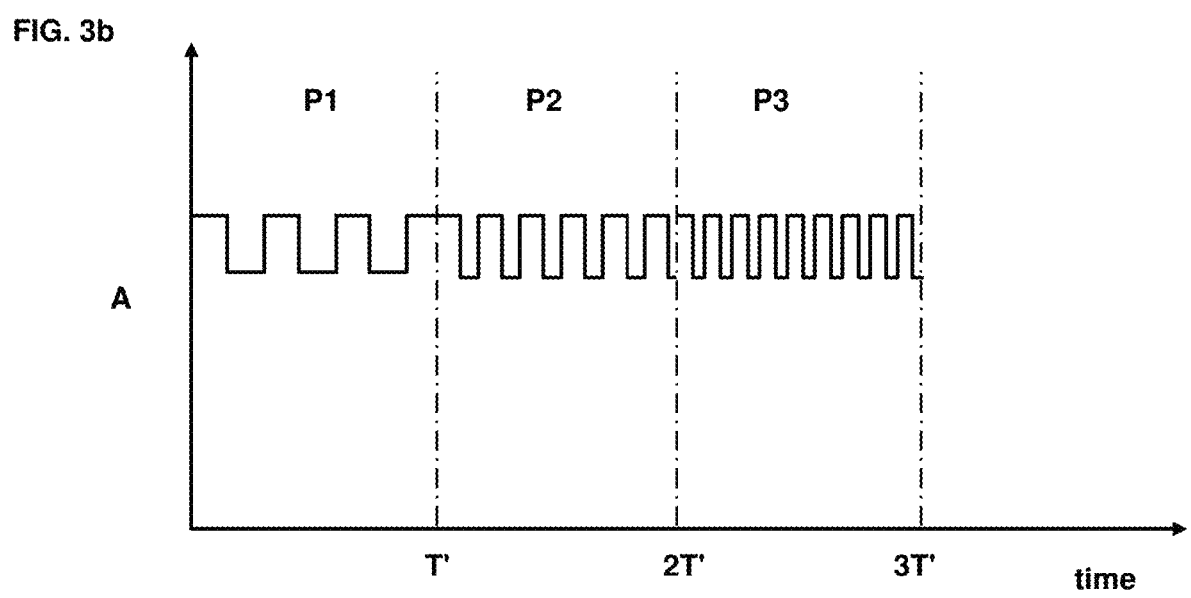
FIG. 3b represents steps of amplitude modulating signals of adjacent pixels of the external scene.

The signal exposition time for each pixel has to guarantee a sufficient signal to noise ratio (SNR), but does not need any waiting time due to marking each pixel signal with an amplitude modulation. This is illustrated in FIG. 3b where the laser signal for each pixel is amplitude modulated (in addition to the frequency modulation) with a different characteristic frequency $f_{AM}$. These frequencies can be identified with a fast Fourier transform of the detected mixing signal as sidebands surrounding each beat signal. This method guarantees that each received signal can be assigned to the corresponding pixel n, even when it is detected in a time window corresponding to pixel n+1. The frequency and amplitude modulation for up- and down-chirp can be chosen differently to decrease the ambiguity between signals stemming from different pixels.

Consequently, the pixel illuminating time T' shown FIG. 3a and FIG. 3b is shorter than the illuminating time T shown FIG. 2.

The electric field equations of up- and down-chirp for pixel n are, therefore, given by:

$$E_{up,n} = (1 + \cos 2\pi f_{AM,1in} t) \cdot \cos \varphi_{up}$$

$$E_{down,n} = (1 + \cos 2\pi f_{AM,2in} t) \cdot \cos \varphi_{down}$$

with i and n indicating that the amplitude frequencies for up- and down-chirp and each pixel can be chosen differently, φ being the phase delay between the emitted and received laser signals.

It is of course understood that obvious improvements and/or modifications for one skilled in the art may be implemented, still being under the scope of the disclosure as it is defined by the appended claims. In particular, it is mentioned that two modulating units are provided, but only one modulating unit might be provided for performing the frequency modulation and the amplitude modulation.

What is claimed is:

1. A method for processing a laser signal to illuminate and capture an external scene with a laser device, the external scene being sectored in pixels, the method comprising the steps of:
   frequency modulating with a first modulating unit a laser signal in up and down-chirps;
   polarizing each of the up chirps with a first specific polarization and each of the down chirps with a second specific polarization different to the first polarization;
   illuminating with an illuminating unit the external scene with at least a part of the modulated laser signal;
   receiving with a receiving unit a reflected laser signal, having up and down received chirps, for each pixel;
   simultaneously illuminating the external scene with the up-chirp of the modulated laser signal and with the down-chirp of the modulated laser signal for at least one pixel;
   using a part of the reflected up and down chirps signal received within a time frame before an overlapping time ($T_o$) when the up and down chirps of the frequency modulated laser signal cross each other, to predict a reflected signal at the overlapping time ($T_o$), so as to identify a relevant part of a reflected signal originating from the emitted up-chirp or down-chirp laser signal; and
   amplitude modulating with a second modulating unit the frequency modulated laser signal of at least two adjacent pixels, according to at least two different amplitude modulations, so that a calculating unit can distinguish the reflected laser signals of two adjacent pixels on the basis of the two different amplitude modulations, then simultaneously illuminating the external scene with the up-chirp of the modulated laser signal and with the down-chirp of the modulated laser signal for at least one pixel.

2. The method according to claim 1, wherein for at least a plurality of adjacent pixels, the external scene is simultaneously illuminated with the up-chirp of the modulated laser signal and with the down-chirp of the modulated laser signal, without any chirp reset between adjacent pixels.

3. The method according to claim 1, wherein the external scene is simultaneously illuminated with the up-chirp of the modulated laser signal and with the down-chirp of the modulated laser signal so as to simultaneously receive from the external scene the up and down received chirps for each pixel.

4. The method according to claim 1, comprising the steps of:
   before illuminating the external scene, in case no amplitude modulation is performed, or before amplitude modulating the modulated laser signal, in case the amplitude modulation is performed: splitting the modulated laser signal with a laser splitter unit, so as to send a first part of the modulated laser signal to the illuminating unit, and to generate a reference signal with a second part of the modulated laser signal serving as a reference local oscillator signal; and
   before measuring the up and down beat signals for each pixel, mixing the received reflected laser signal with the reference local oscillator signal.

5. The method according to claim 4, comprising the steps of:
   measuring with the calculating unit an up-beat signal from a difference between the received up-chirp and the reference local oscillator signal, for each pixel; and
   measuring with the calculating unit a down-beat signal from a difference between the received down-chirp and the reference local oscillator signal for each pixel.

6. The method according to claim 1, wherein the step of modulating with the first modulating unit the laser signal in consecutive up and down-chirps having a constant slope, for at least two adjacent pixels, is a step of modulating according to at least two different frequency modulations.

7. The method according to claim 1, further comprising:
   an external scene processing phase.

8. The method according to claim 1, wherein for at least one pixel:
   the up-chirp of the modulated laser signal is amplitude modulated according to an up-amplitude modulation; and
   the down-chirp of the modulated laser signal is amplitude modulated according to a down-amplitude modulation, different from the up-amplitude modulation.

9. The method according to claim 1, wherein the calculating unit carries out a Fast Fourier Transform, to distinguish the reflected laser signals of two adjacent pixels.

10. An external scene analysis module comprising:
    a first modulating unit;
    an illuminating unit;
    a receiving unit; and
    a calculating unit;
    the external scene analysis module being configured to implement a method for processing a laser signal comprising the steps of:
    frequency modulating with the first modulating unit a laser signal in up and down-chirps;
    polarizing each of the up chirps with a first specific polarization and each of the down chirps with a second specific polarization different to the first polarization;
    illuminating with the illuminating unit an external scene with at least a part of the modulated laser signal;
    receiving with the receiving unit a reflected laser signal, having up and down received chirps, for each pixel;
    simultaneously illuminating the external scene with the up-chirp of the modulated laser signal and with the down-chirp of the modulated laser signal for at least one pixel;
    using a part of the reflected up and down chirps signal received within a time frame before an overlapping time (To) when the up and down chirps of the frequency modulated laser signal cross each other, to predict a reflected signal at the overlapping time (To), so as to identify a relevant part of a reflected signal originating from the emitted up-chirp or down-chirp laser signal; and
    amplitude modulating with a second modulating unit the frequency modulated laser signal of at least two adjacent pixels, according to at least two different amplitude modulations, so that a calculating unit can distinguish the reflected laser signals of two adjacent pixels on the basis of the two different amplitude modulations, then simultaneously illuminating the external scene with the up-chirp of the modulated laser signal and with the down-chirp of the modulated laser signal for at least one pixel.

11. The external scene analysis module according to claim 10, wherein for at least a plurality of adjacent pixels, the external scene is simultaneously illuminated with the up-chirp of the modulated laser signal and with the down-chirp of the modulated laser signal, without any chirp reset between adjacent pixels.

12. The external scene analysis module according to claim 10, wherein the external scene is simultaneously illuminated with the up-chirp of the modulated laser signal and with the down-chirp of the modulated laser signal so as to simultaneously receive from the external scene the up and down received chirps for each pixel.

13. The external scene analysis module according to claim 10, the method for processing the laser signal further comprising the steps of:
  before illuminating the external scene, in case no amplitude modulation is performed, or before amplitude modulating the modulated laser signal, in case the amplitude modulation is performed: splitting the modulated laser signal with a laser splitter unit, so as to send a first part of the modulated laser signal to the illuminating unit, and to generate a reference signal with a second part of the modulated laser signal serving as a reference local oscillator signal; and
  before measuring the up and down beat signals for each pixel, mixing the received reflected laser signal with the reference local oscillator signal.

14. The external scene analysis module according to claim 13, the method for processing the laser signal further comprising the steps of:
  measuring with the calculating unit an up-beat signal from a difference between the received up-chirp and the reference local oscillator signal, for each pixel; and
  measuring with the calculating unit a down-beat signal from a difference between the received down-chirp and the reference local oscillator signal for each pixel.

15. The external scene analysis module according to claim 10, wherein, the step of modulating with the first modulating unit the laser signal in consecutive up and down-chirps having a constant slope, for at least two adjacent pixels, is a step of modulating according to at least two different frequency modulations.

16. The external scene analysis module according to claim 10, wherein for at least one pixel:
  the up-chirp of the modulated laser signal is amplitude modulated according to an up-amplitude modulation; and
  the down-chirp of the modulated laser signal is amplitude modulated according to a down-amplitude modulation, different from the up-amplitude modulation.

17. The external scene analysis module according to claim 10, wherein the calculating unit carries out a Fast Fourier Transform, to distinguish the reflected laser signals of two adjacent pixels.

18. A vehicle comprising a laser device, the vehicle configured to perform a method including steps comprising:
  frequency modulating with a first modulating unit a laser signal in up and down-chirps;
  polarizing each of the up chirps with a first specific polarization and each of the down chirps with a second specific polarization different to the first polarization;
  illuminating with an illuminating unit the external scene with at least a part of the modulated laser signal;
  receiving with a receiving unit a reflected laser signal, having up and down received chirps, for each pixel;
  simultaneously illuminating the external scene with the up-chirp of the modulated laser signal and with the down-chirp of the modulated laser signal for at least one pixel;
  using a part of the reflected up and down chirps signal received within a time frame before an overlapping time (To) when the up and down chirps of the frequency modulated laser signal cross each other, to predict a reflected signal at the overlapping time (To), so as to identify a relevant part of a reflected signal originating from the emitted up-chirp or down-chirp laser signal; and
  amplitude modulating with a second modulating unit the frequency modulated laser signal of at least two adjacent pixels, according to at least two different amplitude modulations, so that a calculating unit can distinguish the reflected laser signals of two adjacent pixels on the basis of the two different amplitude modulations, then simultaneously illuminating the external scene with the up-chirp of the modulated laser signal and with the down-chirp of the modulated laser signal for at least one pixel.

19. The vehicle of claim 18, wherein for at least a plurality of adjacent pixels, the external scene is simultaneously illuminated with the up-chirp of the modulated laser signal and with the down-chirp of the modulated laser signal, without any chirp reset between adjacent pixels.

20. The vehicle of claim 19, wherein the external scene is simultaneously illuminated with the up-chirp of the modulated laser signal and with the down-chirp of the modulated laser signal so as to simultaneously receive from the external scene the up and down received chirps for each pixel.

* * * * *

UNITED STATES PATENT AND TRADEMARK OFFICE
CERTIFICATE OF CORRECTION

PATENT NO. : 12,235,394 B2
APPLICATION NO. : 17/096776
DATED : February 25, 2025
INVENTOR(S) : Roman Dietz et al.

Page 1 of 1

It is certified that error appears in the above-identified patent and that said Letters Patent is hereby corrected as shown below:

On the Title Page

Item (57), Abstract Column 2, Line 12: Delete "up-" and insert --up--

In the Claims

Column 8, Line 58: In Claim 10, delete "(To)" and insert --($T_o$)--
Column 8, Line 61: In Claim 10, delete "(To)," and insert --($T_o$),--
Column 10, Line 26: In Claim 18, delete "(To)" and insert --($T_o$)--
Column 10, Line 28: In Claim 18, delete "(To)" and insert --($T_o$)--

Signed and Sealed this
Twenty-ninth Day of April, 2025

Coke Morgan Stewart
*Acting Director of the United States Patent and Trademark Office*